US 11,235,656 B2

United States Patent
Tušek (10) Patent No.: US 11,235,656 B2
(45) Date of Patent: Feb. 1, 2022

(54) VEHICULAR FRONT AXLE POWERTRAIN WHICH USES AN ELECTRIC MOTOR WITH AN EXTERNAL ROTOR

(71) Applicant: Aljoša Tušek, Ptuj (SI)

(72) Inventor: Aljoša Tušek, Ptuj (SI)

( * ) Notice: Subject to any disclaimer, the term of this patent is extended or adjusted under 35 U.S.C. 154(b) by 0 days.

(21) Appl. No.: 16/975,357

(22) PCT Filed: Feb. 22, 2019

(86) PCT No.: PCT/SI2019/050003
§ 371 (c)(1),
(2) Date: Aug. 24, 2020

(87) PCT Pub. No.: WO2019/164456
PCT Pub. Date: Aug. 29, 2019

(65) Prior Publication Data
US 2021/0252966 A1    Aug. 19, 2021

(30) Foreign Application Priority Data
Feb. 23, 2018   (SI) ................... P-201800044

(51) Int. Cl.
*B60K 1/04*    (2019.01)
*B60K 7/00*    (2006.01)
(Continued)

(52) U.S. Cl.
CPC ............ *B60K 7/0007* (2013.01); *B60K 11/00* (2013.01); *B60K 17/02* (2013.01); *B60L 7/10* (2013.01);
(Continued)

(58) Field of Classification Search
CPC .......... B60L 50/64; B60L 50/66; B60K 1/04; H01M 50/20
See application file for complete search history.

(56) References Cited

U.S. PATENT DOCUMENTS

2009/0088914 A1   4/2009   Mizutani et al.
2009/0242289 A1   10/2009  Murty
(Continued)

FOREIGN PATENT DOCUMENTS

BE    1019194       4/2012
EP    2558741 A1    2/2013
(Continued)

*Primary Examiner* — James A Shriver, II
*Assistant Examiner* — James J Triggs (57) ABSTRACT

Vehicular front axle powertrain, which uses an electric motor with an external rotor is for driving and braking of the front axles of vehicles with wheels which also or only use electrical power. It consists of an electric engine (1) with an external rotor or rotor extension (1.2), which is also a generator working as a brake. The rotor or rotor extension (1.2) connects to a clutch (3), which guards against overload and may have a disc brake (3.I) mounted, which carries excess braking force. The clutch (3) connects to an internal joint (4), which connects to a shaft (5), which has an external homokinetic joint (6) with a hub shaft (6.2) for the vehicle's wheel. Rotational energy goes from the electric motor (I) without mechanical losses to the hub shaft (6.2) and back, while the hub shaft (6.2) can move relative to the stator in the (SA) and (SB) directions.

18 Claims, 3 Drawing Sheets

(51) Int. Cl.
  *B60K 11/00*    (2006.01)
  *B60K 17/02*    (2006.01)
  *B60L 7/10*     (2006.01)
  *H02K 5/18*     (2006.01)
  *H02K 7/00*     (2006.01)
  *H02K 7/112*    (2006.01)
  *F16D 7/06*     (2006.01)

(52) U.S. Cl.
  CPC ............... *H02K 5/18* (2013.01); *H02K 7/006* (2013.01); *H02K 7/112* (2013.01); *B60K 2007/0038* (2013.01); *F16D 7/06* (2013.01)

(56) References Cited

U.S. PATENT DOCUMENTS

| | | | | |
|---|---|---|---|---|
| 2019/0253561 A1* | 8/2019 | Hassan | ................ | H04L 12/1818 |
| 2019/0283517 A1* | 9/2019 | Battaglia | .................. | B60G 3/20 |
| 2019/0283522 A1* | 9/2019 | Battaglia | .............. | B60K 17/043 |
| 2021/0079992 A1* | 3/2021 | Maguire | ................. | F16D 55/24 |

FOREIGN PATENT DOCUMENTS

| | | | |
|---|---|---|---|
| SI | 9400116 A | | 10/1995 |
| SI | 0662012 | | 8/1998 |
| SI | 20684 | | 4/2002 |
| SI | 1250748 | | 6/2007 |
| SI | 24175 A | | 3/2014 |
| SI | 24775 | | 1/2016 |

\* cited by examiner

VEHICULAR FRONT AXLE POWERTRAIN WHICH USES AN ELECTRIC MOTOR WITH AN EXTERNAL ROTOR

The current application is a 371 of international Patent Cooperation Treaty (PCT) application PCT/SI2019/050003 filed on Feb. 22, 2019.

FIELD OF THE INVENTION

The present invention relates generally to electric motors. More specifically, the present invention relates to a motor with increased power transfer efficiency and regenerative braking.

BACKGROUND OF THE INVENTION

The object of the invention is the technical system of connecting an electric motor with an external rotor, a safety clutch with a disc brake, internal homokinetic joint, shaft, and external homokinetic joint with a shaft for mounting the wheel hub.

The problem that the presented invention solves is that it enables the direct power transmission from the rotor of the electric motor to the drive shaft of the vehicle using this type of drive. This system can also be used for driving machines, water vessels, and other technical devices.

The second problem this invention solves is that the presented powertrain enables using 100% of the power from the electric engine to the wheel, because it lacks any components reducing efficiency, as has been used until now by technical solutions using gearboxes and differentials.

The third problem this invention solves is that the braking energy generated during a vehicle's normal braking can be transmitted through the wheel and shaft to the electric engine, which acts as a generator in the case of braking, converts the braking energy to electric energy and transports it to the batteries.

The electric motor, which can also be a generator, can only handle a limited amount of braking power. The power is limited by the capability of the electric motor.

The proposed invention also enables mounting the disc brake on the clutch, however the brake can also be mounted not on the clutch but on the wheel, as is commonplace.

If maximal braking power is required, the difference in power is provided by the disc brake mounted on the powertrain's safety clutch.

Until now, we have had vehicles powered by electric motors using mechanical power transmission units, such as gearboxes. To distribute the power and revolutions between the left and right drive shafts, differentials have been in use.

All of the above-mentioned methods of power transmission increase mechanical losses, which manifest themselves in the transmission units as heat, noise, wear, lubrication oil shearing, etc.

Mechanical transmission units increase the vehicle's mass and, of course, increase its cost price. Ultimately, mechanical transmission units require servicing. They also cause a so-called critical link in transmitting energy-power from electric motors to the wheels, where equipment breakdowns and consequent interruptions in power transmission. Until now we have failed to observe any similar known solutions.

BRIEF SUMMARY OF RELATED PRIOR ART

Patent No. 1:
Application No.: SI20010030693T 20010126
Pub. No.: WO 2001/056138 (WACHAUER Oskar [AT/AT]) 2 Aug. 2001 (2001 Aug. 2)
Name of invention: Vehicular electric drive This invention covers the drive by an electric motor, where the rotor and stator are rotating. This drive is designed primarily for multi-track vehicles. It also has the option of setting the gears via epicyclical gearing.

This invention uses completely different technical solutions to our proposed invention, which transmits power from the electric motor directly to the wheel, without using toothed or similar transmission units.

This invention has no equal or similar technical solutions whatsoever to our proposed invention.

Patent No. 2
Application No.: SI9400116A
Pub. No.: SI 9400116 A (BAJT Niko [SI]) 31 Oct. 1995 (1995 Oct. 31)
Name of invention: Electromagnetic driving-braking unit This invention covers a similar technical invention by proposing that the electro motor be placed by the wheel, thereby adversely affecting the unsprung mass of the wheel with motor, while the invention we submit proposes placing the electric motor as close as possible to the center of the vehicle, which avoids influence on any unsprung mass, and additionally lowers the vehicle's center of gravity.

It suggests drive and braking with the electric motor, which has been known technology for a long time. It does not propose an intermediate clutch that would prevent overloading the electric motor during braking.

This invention also does not plan for an outside rotor, but rather a normal electric motor with an internal rotor.

This invention also does not propose the free movement of the drive shaft for steering the wheels. It does not propose ways to cool the electric motor.

This invention also uses completely different technical solutions to our suggested invention.

Patent No. 3
Application No.: SI201200282A
Pub. No.: SI 24175 A (PFEIFER Boris [SI]) 31 Mar. 2014 (2014 Mar. 31)
Name of invention: Electric kit This invention enables a simple and cost-effective way of transforming existing internal combustion engines using a gearbox and clutch into an electric kit. It consists of an electric motor mounted and fixed to the housing of the internal combustion engine and driven by batteries with sufficient power or characteristics, via an electronic control unit. The engine's crank shaft transfers power to the existing gearbox to at least one driven wheel via the existing clutch.

This invention proposes mounting the electric engine inside the internal combustion engine. Power is transferred via the engine's crank shaft through the clutch to toothed transmission units (gearboxes and differentials).

This invention does not deal with transferring power directly to the wheel from the electric motor, but rather proposes using one of the vehicle's existing toothed transmission units, and is planned as a kit for the modification of vehicles using fossil fuels to electric motors.

This invention uses no similar technical solutions whatsoever to our suggested invention, and therefore has no shared properties.

Patent No. 4:
Application No.: SI20140000266 20140721
Pub. No.: SI 24775 A (KOPRIVSEK Mitja [SI]) 29 Jan. 2016 (2016 Jan. 29)

Name of invention: The device for the interruption of the primary electrical circuit in the electric vehicle, particularly in the event of a collision of the vehicle This invention covers and proposes the technical solution for cutting electrical current in vehicles in the events of car accidents.

It has no technical characteristics in common with our proposed invention. But this invention can be used as an upgrade to our proposed invention with the aim to increase the safety of an electric vehicle by equipping said vehicle with the electric circuit cut-off device, as proposed by this invention.

This invention has no technical characteristics in common with our proposed invention, and so is completely different and uses completely different technical solutions.

Patent No. 5:
Application No.: 5119940030158T
Pub. No.: WO/1995/03096 (STROTHMANN, Rolf [DE])
2 Feb. 1995 (1995 Feb. 2)

Name of invention: A travelling device primarily driven, in particular drawn or pushed, by human or animal power comprising electric auxiliary drive This invention is a device which uses the driver's muscular energy and electrical energy. This invention uses technical solutions completely different to our proposed invention. Primarily, it is focused on a type of drive using electrical energy and the driver's muscular power. It uses no equal or similar technical approaches to our proposed invention for any technical solution.

Patent No. 6:
Application No.: SI20000000227 20000918
Pub. No.: SI 20684 A (Kovacic Danilo, [SI]) 30 Apr. 2002 (2002 Apr. 30)

Name of invention: Hybrid vehicle driving assembly

This invention proposes connecting the electric motor working as the internal combustion engine's starter motor as the drive motor and electric generator, and as an electric brake.

It consists of connecting the engine and electric motor with a clutch; the electric motor and the gearbox behind it are connected with a clutch, where the gearbox is followed by a drive shaft with transmission to the wheels in a way, where both engines and both clutches together are controlled with a controlling device.

This invention primarily covers the inclusion of the electric engine into the existing powertrains of motor vehicles. The power from the drives is not routed directly to the wheels, but rather through toothed transmissions, which cause losses. This invention uses no technical solutions similar to our proposed invention, making it technically completely different to our proposed invention.

Patent No. 7:
Application No.: 12056632
Pub. No.: US 2009/242289 A1 (MURTY BALARAMA V [US]) 1 Oct. 2009 (2009 Oct. 1)

Name of invention: System and method of differentiating rotational speed and torque between wheels of a hybrid vehicle This invention proposes the mode of propulsion of a hybrid vehicle with different drives and suggests a means of communication or steering the individual drivetrains. Our proposed invention does not describe the means of controlling the drivetrains or their communication. This invention uses a similar electrical drive system as our proposed invention, but does not use a shaft drive with an electric motor with an external rotor, it does not use innovative rotor cooling methods, it does not use disc brake placement on the sprung part of the vehicle, it does not use a safety clutch on the wheel drive, etc.

Innovative differences between our proposed invention and this invention are that this invention does not use:

A disc brake on the sprung part of the vehicle directly on the drive shaft of the wheel.

A safety clutch to disconnect the electric motor or to shut off all drive elements in the case of a breakdown of any individual element of the drivetrain, and especially in the case of a failure of the electric motor.

An external rotor providing much higher propulsion torque (greater rotor diameter)

Cooling methods of the external rotor carried out in our proposed invention by air or liquid cooling directly over the external surface of the external surface of the external rotor via the cooling fins (1.R), the surface of which is much larger due to the external rotor and therefore allows for a greater heat transfer.

Does not demonstrate or protect the possibility of using waste heat from the electric motor to heat the cab and batteries, as demonstrated by our proposed invention.

All of the inventions listed above use technical solutions completely different to our proposed invention.

Primarily, they differ from our invention in that they do not transfer the electric motor's power through an external rotor directly to the wheel, but rather use toothed transmission components, and in one case the electric motor is mounted directly to the wheel, increasing the unsprung mass and does not use an external rotor, which is a core advantage of our proposed invention.

BRIEF DESCRIPTION OF THE DRAWINGS

FIG. 1 also shows the so-called breaks in shaft SB around internal pivot center 4.1 of internal joint 4, and breaks in shaft SA around external pivot center 6.1 of external homokinetic joint 6. Modem M and electric connection EV of stator 1.1 to modem M are shown.

DETAIL DESCRIPTIONS OF THE INVENTION

All illustrations of the drawings are for the purpose of describing selected versions of the present invention and are not intended to limit the scope of the present invention.

The vehicular front axle powertrain, which uses an electric motor with an external rotor is designed so that stator 1.1 is fixed to the frame of the vehicle containing the vehicular front axle powertrain, which uses an electric motor with an external rotor.

The powertrain of the front axle of vehicles, which uses electric motor 1 with external rotor or rotor extension 1.2 is designed for driving the front axles of all vehicles driving on wheels, but it can also be used on the rear axles of these vehicles, single or multi-track vehicles, water vessels for powering propellers, in machines for any type of drive, and other devices, where the transmission of torque is required. It is presumed that one powertrain of a front axle of a vehicle which uses an electric motor with an external rotor only powers one wheel, which is mounted via a hub to hub shaft 6.2, of external homokinetic joint 6.

Clamping 1.1.1 of stator 1.1 transmits all forces and torques working through electric motor 1 external rotor to rotor extension 1.2, clutch 3, through internal joint 4, shaft 5 to external homokinetic joint 6, then to hub shaft 6.2, to which the hub with the wheel is fixed, through which torques and forces are transmitted from the vehicle to the road and back.

Clamping 1.1.1 also transmits the forces of the weight and mass accelerations/decelerations that result from vibrations, the vehicle's vertical motions due to uneven surfaces, vertical wheel movement, forces from the vehicle's accelerations and decelerations, etc.

A vital new feature of the presented invention is that stator 1.1 of electric motor 1 is a fixed element, which is fixed to the vehicle via the clamping 1.1.1, while external rotor or rotor extension 1.2 of electric motor 1 spins at the same rotational speed as the shaft 5 and the hub shaft 6.2, or wheel.

Because external rotor or the rotor extension 1.2 is mounted on the outside of the diameter of electric motor 1, this technically enables the much quicker cooling of electric motor 1 with the surrounding air, which is crucial for the better efficiency of electric motor 1.

It is known that magnetism loses magnetic flux as the temperature rises and loses practically all magnetism at around 720 degrees Celsius—this is true of permanent magnets. But magnetism is in correlation to the efficiency of electric motor 1.

To achieve even better efficiency of electric motor 1, it is also water-cooled. Energy or heat of the cooling water from electric motor 1 is used to heat the vehicle cabin and/or for heating the internal combustion engine if the vehicular front axle powertrain, which uses an electric motor with an external rotor is used on a hybrid or similar vehicle. The energy of the heated water can, in winter or other cold operational conditions, also be used to heat batteries, or for other purposes.

Electric motor 1 is also cooled with the surrounding air, flowing around electric motor 1. Due to the vehicle's speed and air vents which can be installed, we guide the surrounding air so that it flows around electric motor 1 and, due to heat exchange, removes heat from it, thereby lowering the temperature of electric motor 1. For better cooling efficiency, electric motor 1 is fitted with cooling fins 1.R, which increase the exterior surface area of electric motor 1 or its external rotor and rotor extension 1.2 respectively, and thereby improve the transfer of heat from electric motor 1 to the surrounding air.

The heated air, which has received thermal energy from electric motor 1, is used to heat the vehicle's cabin, or to additionally heat an internal combustion engine, if we are using the vehicular front axle powertrain, which uses an electric motor with an external rotor for hybrid vehicles. The heated air can also be used to heat batteries, if this is required due to batteries being too cold.

The vehicular front axle powertrain, which uses an electric motor with an external rotor is designed so that the wheel, which is mounted via a hub to hub shaft 6.2 of the external homokinetic joint 6, can move in all directions required by the geometry of guiding the vehicle's front wheel, while at the same time it can spin and transmit acceleration and deceleration torques in directions SD or SL.

To achieve the required wheel or hub shaft 6.2 movements toward the knot or stator 1.1, the vehicular front axle powertrain, which uses an electric motor with an external rotor contains two pivot centers, namely:

1. Internal pivot center 4.1, which is mounted in internal joint 4 and enables the movement of shaft 5 relative to the vehicle or stator 1.1 in directions SB by the angle of BK, reaching from BK=0 degrees to BK=80 degrees, while at the same time transmitting torques in the SD and SL directions, and is designed as a homokinetic joint, which is the current state of the art, so we will not describe the construction of internal joint 4.1 in greater detail.
2. The external pivot center 6.1 installed in the external homokinetic joint 6 and enables the motion of hub shaft 6.2 relative to shaft 5 in the SA direction by an angle of AK, reaching from AK=0 degrees to AK=80 degrees, while at the same time transmitting torques in the directions SD and SL, is designed in the homokinetic joint and is the current state of the art, so we will not describe the construction of external homokinetic joint 6 in greater detail.

The vehicular front axle powertrain, which uses an electric motor with an external rotor transmits all torques produced by electric motor 1 and transmits them to hub shaft 6.2 or the vehicle's wheel, which transmits the energy from electric motor 1 to the road surface and back, without intermediate links, i.e. with 100% efficiency.

The vehicular front axle powertrain, which uses an electric motor with an external rotor is designed in such a way that even if the wheel or hub shaft 6.2 move in the directions SA by the angle AK and SB by the angle BK, and is simultaneously spinning around the pivot centers in the directions SD and SL, it transmits the entire torque and rotational speed from electric motor 1 to hub shaft 6.2 in its entirety, without mechanical or any other losses.

Figure 1:
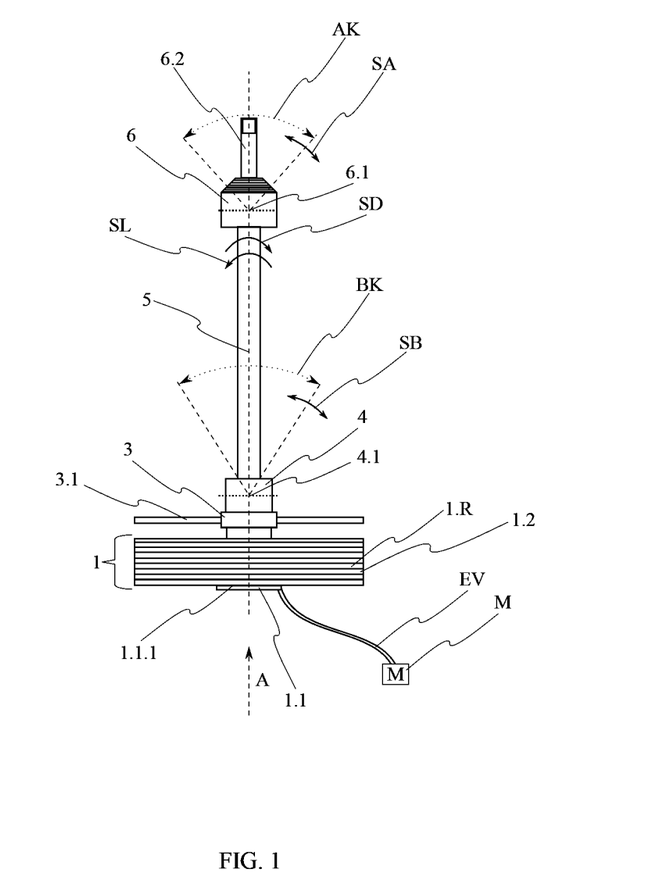
FIG. 1 Shows the schematic connection of electric motor 1, external rotor or rotor extension 1.2 with the clutch 3, onto which disc brake 3.1 may be mounted with internal joint 4 and shaft 5, with external homokinetic joint 6 fixed to it with hub shaft 6.2, where the wheel hub and vehicle's wheel are attached. Shown are the shaft (5) movement directions around the midline to the right SD and left SL, if the powertrain is viewed toward the stator, as shown in FIG. 2.
Figure 2:
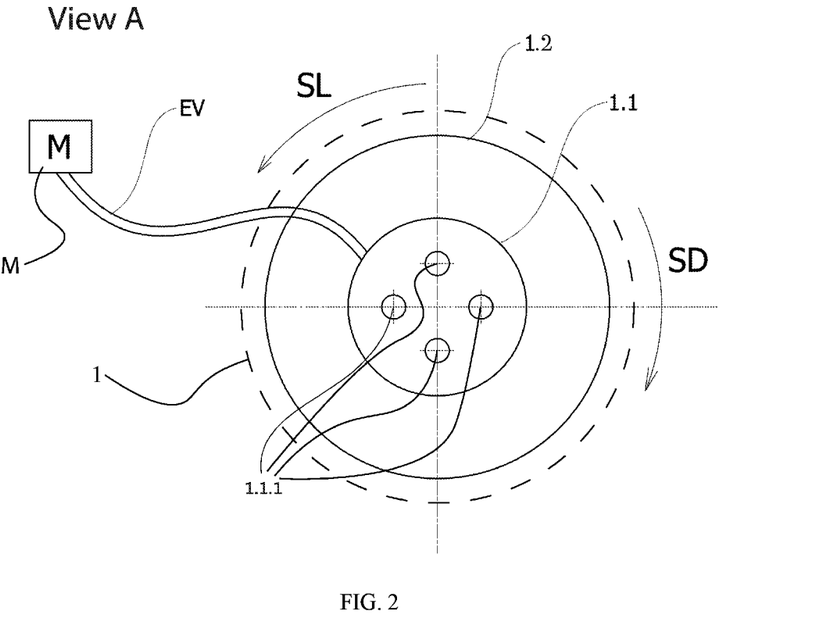
FIG. 2 shows the side view of the powertrain, where stator 1.1 of the electric motor 1 with connecting elements 1.1.1 for connecting the powertrain to the vehicle. The directions of drives and brakes SD and SL, modem M, and electric connection EV with modem M are visible.
Figure 3:
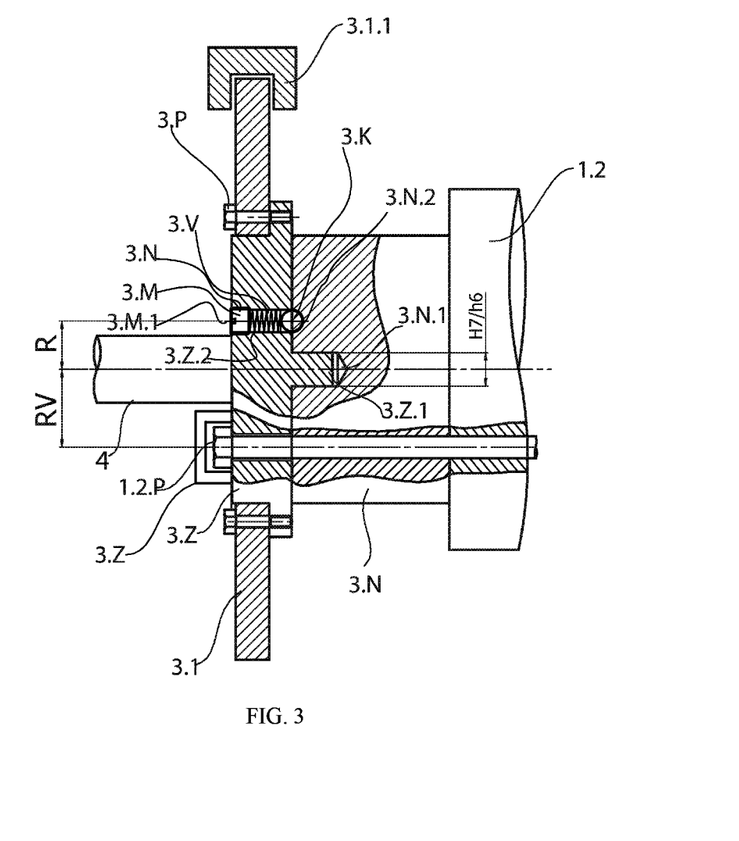
FIG. 3 shows clutch 3 with disc brake 3.1.

Clutch 3 is constructed as a so-called safety clutch, which releases or relaxes the mechanical torque connection if it were to exceed 800 Nm.

This safety is planned because the electric motor, if it is used to brake the vehicle, can only cope with (handle) a limited amount of power. When braking, electric motor 1 works as a generator and transforms the kinetic energy manifesting itself through shaft 5 to the external rotor or rotor extension 1.2 and creates a so-called magnetic flux in stator 1.1, which brakes the rotor or rotor extension 1.2, thereby converting kinetic energy to electrical energy. Electric motor 1 dispatches this electrical energy via conductor EV to modem M, which then sends it to the batteries and other consumers.

If there is too much of this electrical energy per unit of time or power, modem M is unable to continually distribute it to the previously mentioned consumers. In this case, we find that it is unable to convert all of the power. Even if modem M could distribute all of the converted energy (power) to the other consumers and batteries, the so-called weak link is electric motor 1, which is designed or limited by its rated power and can only convert an amount of power limited to the power rated for electric motor 1. Electric motor 1 can only convert the kinetic energy of 500 Nm, or up to 800 Nm for short periods, of torque from shaft 5. Due to this limitation, clutch 3 is fitted with disc brake 3.1, which handles torque exceeding 500 Nm and brakes the vehicular front axle powertrain, which uses an electric motor with an external rotor, if this is deemed necessary for safety reasons, or to achieve greater deceleration of the vehicle.

Disc brake 3.1 is press-fitted to the outside part 3.Z of clutch 3 which centres disc brake 3.1 and is made on the outside part 3.Z of clutch 3. The press fit is done with bolts 3.P, of which there can be three or more. Disc brake calliper 3.1.1 of disc brake 3.1 is fixed to the vehicles in ways which are current state of the art and are not covered by this proposed invention. External part 3.Z of clutch 3 has a centring plug 3.Z.1, which is pressed into hole 3.N.1 of internal part 3.N of clutch 3. The fit between plug 3.Z.1 and hole 3.N.1 is done to a tolerance of H7/h6, which means that plug 3.Z.1 can move freely inside hole 3.N.1, while at the same time centring internal part 3.N and external part 3.Z of clutch 3 between themselves.

Internal part 3.N of clutch 3 contains bore 3.N.2 with spherical end, while external part 3.Z contains hole 3.Z.2. The diameters of hole 3.Z.2 and bore 3.N.2 are from O=3 mm to O=100 mm.

Steel ball 3.K is placed inside bore 3.N.2 through hole 3.Z.2, and coil spring 3.V or tapered spring 3.V is inserted. At the near end of hole 3.Z.2, there is an internal thread 3.N.M into which screw 3.M is screwed and which can be screwed in or out via press fit 3.M.1 or from hole 3.Z.2 along thread 3.N.M.

By tightening screw 3.M we increase the force on spring 3.V which presses onto steel ball 3.K, which presses onto the surface of bore 3.N.2, which is made spherically in such a way, so that steel ball 3.K sits into the surface of the sphere, thereby transmitting torques and rotational speed from internal part 3.N of clutch 3 to external part 3.Z of clutch 3 and back.

Hole 3.Z.2 and bore 3.N.2 are made in the same position relative to radius R, which is between R=20 mm and R=500 mm. There can be any number N of holes 3.Z.2 and bores 3.N.2, from N=1 to N=30. Radii R onto which holes 3.Z.2 and bores 3.N.2 are made and number N of them depends on how much torque we wish to limit with clutch 3.

It is not necessary that each hole 3.Z.2 contains a steel ball 3.K with spring 3.V and screw 3.M. Their number depends on how much torque we wish to transmit from internal part 3.N to external part 3.Z of clutch 3 and back.

Internal part 3.N and external part 3.Z of clutch 3 are axially connected to each other with bolts 1.2.P, of which there can be at least three, distributed around the circumference, but there can be any number of them. Bolts 1.2.P also connect clutch 3 with external rotor or rotor extension 1.2 of electric motor 1.

Bolts 1.2.P and their amount are on any radius RV, but which are specified from RV=520 mm and 800 mm, according to the torque that bolts 1.2.P have to carry. The number of bolts 1.2.P is between 3 and 20.

Internal joint 4 is rigidly fixed on the external part 3.Z of clutch 3. It can be shrink fit, welded or fixed in any other way currently known in technology.

Although the invention has been explained in relation to its preferred embodiment, it is to be understood that many other possible modifications and variations can be made without departing from the spirit and scope of the invention as hereinafter claimed.

What is claimed is:
1. A vehicular front axle powertrain, which uses an electric motor with an external rotor, comprising:
   an electric motor (1) with an external rotor or rotor extension (1.2), a clutch (3) which is constructed as a safety clutch,
   a disc brake (3.1) which is press-fixed to an outside part (3.Z) of the safety clutch (3),
   an internal joint (4) which is connected to the outside part (3.Z), on one side and on its other side to
   a shaft (5) which is further connected to
   an external homokinetic joint (6), and this external homokinetic joint (6) is on its other side rigidly connected with
   a hub shaft (6.2)
   and to that hub shaft (6.2) a wheel is attached and fixed, through which torques and forces are transmitted from the vehicle to the road and back;
   a stator (1.1) of electric motor (1) is a fixed element in the middle of the electric motor (1) fixed to the vehicle by a clamping (1.1.1), while external rotor or rotor extension (1.2) of said electric motor (1) spins around the mentioned stator (1.1) at the same rotational speed as the shaft (5), the hub shaft (6.2) and wheel,
   where clamping (1.1.1) of the stator (1.1) transmits all forces and torques working from the electric motor (1) to the wheel and back, without mechanical losses; and
   the external rotor or rotor extension (1.2) is fitted with cooling fins (1.R), which increase the exterior surface area of mentioned electric motor (1) and improve the transfer of heat from mentioned electric motor (1) to the surrounding cooling air and water and this heat is use for heating the vehicle's cabin, to additionally heat an internal combustion engine and to heat a plurality of batteries.

2. A process used by the vehicular front axle powertrain, the process:
   which uses an electric motor (1) with an external rotor marked by the external rotor or rotor extension (1.2) driving an internal joint (4), a shaft (5), an external homokinetic joint (6) and a hub shaft (6.2) to which a wheel of the vehicle is attached without any mechanical losses and is also driven by same mentioned elements when braking with the electric motor (1) which transmits braking kinetic energy into electric energy and accumulates this energy in a plurality of batteries;
   braking is also arranged to be carried out by a disc brake (3.1) mounted directly on an external part (3.Z) of a safety clutch (3), or by both principles together when braking torque exceeds 800 Nm which regulates a modem (M);
   the external rotor or rotor extension (1.2) is cooled through cooling fins (1.R) by water and by air and that heating energy is used to heat a vehicle cabin, for heating an internal combustion engine and the plurality of batteries;
   in case of crashing/blocking of the electric motor (1) and when the safety clutch (3) torque exceeds 800 Nm the safety clutch (3) disconnects the internal joint (4) from the electric motor (1);
   disconnection occurs due to torque in the safety clutch (3) which forces by pre-pressed steel balls (3.K) of a spring (3.V) of the safety clutch (3) to move out of a spherical bore (3.N.2) of the safety clutch (3) to the surface of the bore (3.N.2) causing a disconnect between an internal part (3.N) and the external part (3.Z) of the safety clutch (3);
   by reducing the torque in the safety clutch (3) the steel balls (3.K) slide back to the bore (3.N.2) and the connection is restored;
   the internal joint (4) allows the shaft (5) movement relative to the vehicle or stator (1.1) in a directions (SB) by an angle of (BK) in directions around the midline to the right (SD) and left (SL) while at the same time transmitting torques in the (SD) and (SL) directions; and an external pivot center (6.1) installed in the external homokinetic joint (6) enables the motion of the hub shaft (6.2) relative to the shaft (5) in a direction (SA) by an angle of (AK), while at the same time transmitting torques in the directions (SD) and (SL).

3. The vehicular front axle powertrain, which uses an electric motor with an external rotor, as per claim 1, is marked by the external rotor or rotor extension (1.2) being mounted to the outside of the diameter of the electric motor (11) and the stator (1.1) being placed inside the mentioned external rotor or rotor extension (1.2) and is rigidly attached to the vehicle by the clamping (1.1.1).

4. The vehicular front axle powertrain, which uses an electric motor with an external rotor, as per claim 1, is marked by the electric motor (1) being cooled by air, water or a mixture thereof through cooling fins (1.R) fitted on the electric motor (1) to enlarge exterior surface for heat exchange, and that the heated air, water, or mixture is distributed to heat the vehicle cabin, to heat the plurality of batteries and for heating an internal combustion engine of the vehicle.

5. The vehicular front axle powertrain, which uses an electric motor with an external rotor, as per claim 1, is marked by enabling the wheel, which is mounted via a hub to the hub shaft (6.2) of the external homokinetic joint (6), movement in the directions (SA) and (SB), while simultaneously enabling the wheel to spin and transmit the acceleration and deceleration torques in the directions (SD) or (SL).

6. The vehicular front axle powertrain, which uses an electric motor with an external rotor, as per claim 1, is marked by fitting the vehicular front axle powertrain, which uses an electric motor (1) with an external rotor or rotor extension (1.2) with two pivot centres, specifically, the internal pivot centre (4.1) and the external pivot centre (6.1).

7. The vehicular front axle powertrain, which uses an electric motor with an external rotor, as per claim 6, is marked by installing the internal pivot centre (4.1) in the internal joint (4), and having it enable the movement of the shaft (5) relative to the vehicle or stator (1.1) in the direction (SB) by the angle (BK), which ranges from (BK)=0 to (BK)=80 degrees, while giving it the ability to transmit torques in the directions (SD) and (SL).

8. The vehicular front axle powertrain, which uses an electric motor with an external rotor, as per claim 6, is marked by installing the external pivot centre (6.1) in the external homokinetic joint (6), and having it enable the movement of the hub shaft (6.2) relative to the shaft (5) in the directions (SA) by the angle (AK), which ranges from (AK)=0 to (AK)=80 degrees, while giving it the ability to transmit torques in the directions (SD) and (SL).

9. The vehicular front axle powertrain, which uses an electric motor with an external rotor, as per claim 1, is marked by designing and constructing the safety clutch (3) as a so-called safety clutch with pre-tensioned steel balls (3.K), which releases the mechanical torque connection if it exceeds 800 Nm.

10. The vehicular front axle powertrain, which uses an electric motor with an external rotor, as per claim 1, is marked by the option to use the electric motor (1) as a brake, and to turn kinetic energy into electrical energy by having the electric motor (1) work as a generator during braking, thereby turning the kinetic energy coming through the shaft (5) to the external rotor or rotor extension (1.2) and creating so-called magnetic flux between the stator (1.1) and external rotor or rotor extension (1.2), which brakes the external rotor or rotor extension (1.2), thereby turning kinetic energy into electrical energy, which the electric motor (1) sends via the conductors EV to the modem M which then sends it to the plurality of batteries and other consumers.

11. The vehicular front axle powertrain, which uses an electric motor with an external rotor, as per claim 1, is marked by allowing the electric motor (1) to convert the kinetic energy coming from the shaft (5) only up to a torque of 500 Nm, or to a torque between 500 Nm and 800 Nm for short periods of time.

12. The vehicular front axle powertrain, which uses an electric motor with an external rotor, as per claim 1, is marked by rigidly press fitting the disc brake (3.1) to the external part (3.Z) of the safety clutch (3), which centres the disc brake (3.1) and is made on the external part (3.Z) of the safety clutch (3) and the press fit is made with at least three bolts (3.P).

13. The vehicular front axle powertrain, which uses an electric motor with an external rotor, as per claim 9, is marked by having any number (N) of holes (3.Z.2) and bores (3.N.2), where the number (N) can range from (N)=1 to (N)=30, and the radii (R) onto which the holes (3.Z.2) and bores (3.N.2) are made can range from (R)=20 mm to (R)=500 mm; the vehicular front axle powertrain is further marked by fitting the external part (3.Z) of the clutch (3) with a centring plug (3.Z.1), which is fitted into the hole (3.N.1) of the internal part (3.N) of the safety clutch (3) and the fit between the centring plug (3.Z.1) and the hole (3.N.1) is made to a tolerance of H7/h6.

14. The vehicular front axle powertrain, which uses an electric motor with an external rotor, as per claim 9, is marked by putting a bore (3.N.2) with spherical end on the internal part (3.N) of the safety clutch (3), and a hole (3.Z.2) on the external part (3.Z) and the diameter of the hole (3.Z.2) and the diameter of the bore (3.N.2) is between 0=3 mm and 0=100 mm.

15. The vehicular front axle powertrain, which uses an electric motor with an external rotor, as per claim 9, is marked by inserting a steel ball (3.K) through the hole (3.Z.2) into the bore (3.N.2) and a coil spring (3.V), which can also be a tapered spring (3.V) presses onto the ball (3.K), and at the near end of the hole (3.Z.2), the hole (3.Z.2) is fitted with an internal thread (3.N.M), into which a nut (3.M) is fitted, and is screwed in or out through the fit (3.M.1) of the hole (3.Z.2) along the thread (3.N.M).

16. The process used by the vehicular front axle powertrain, which uses an electric motor with an external rotor, as per claim 15, is marked by the fact that when tightening the nut (3.M), we increase the force on the spring (3.V) pressing on the steel ball (3.K), which presses on the surface of the bore (3.N.2), which is spherical, so that the steel ball (3.K) fits into the surface of the sphere, thereby transmitting torque and rotational speed from the interior part (3.N) of the safety clutch (3) to the exterior part (3.Z) of the safety clutch (3) and back.

17. The vehicular front axle powertrain, which uses an electric motor with an external rotor, as per claim 9, is marked by placing the hole (3.Z.2) and bore (3.N.2) in equal position relative to radius (R), which is between (R)=20 mm and (R)=500 mm.

18. The vehicular front axle powertrain, which uses an electric motor with an external rotor, as per claim 9, is marked by having any number (N) of holes (3.Z.2) and bores (3.N.2), where the number (N) can range from (N)=1 to (N)=30, and the radii (R) onto which the holes (3.Z.2) and bores (3.N.2) are made can range from (R)=20 mm to (R)=500 mm.

* * * * *